United States Patent

Shai

[11] 4,305,113
[45] Dec. 8, 1981

[54] ADJUSTABLE LOW LOSS CAPACITOR WITH SLOTTED ROTOR

[76] Inventor: Aviv B. Shai, 4 Hazafon St., Savyon, Israel

[21] Appl. No.: 112,512

[22] Filed: Jan. 16, 1980

[51] Int. Cl.³ .............................................. H01G 5/14
[52] U.S. Cl. .................................. 361/296; 361/278; 411/259; 411/312
[58] Field of Search ............ 361/296, 278; 151/14 R, 151/70

[56] References Cited

U.S. PATENT DOCUMENTS

| | | | |
|---|---|---|---|
| 2,035,055 | 3/1936 | Dyer | 151/14 R |
| 2,224,659 | 12/1940 | Stoll | 151/70 X |
| 2,576,438 | 11/1951 | Beach | 151/70 |
| 3,469,160 | 9/1969 | Johanson | 361/296 X |

*Primary Examiner*—Elliot A. Goldberg
*Attorney, Agent, or Firm*—Edward H. Loveman

[57] ABSTRACT

A rotor for an adjustable low loss capacitor having a hollow cylindrical stator with an internally threaded bushing at one end, an axially adjoining insulative cylindrical body, a conductive end member and concentric radially spaced conductive tubes inside said insulative cylindrical body, comprises a rotatable cylindrical screw body having externally threaded portions for engaging internal threading of the bushing. The threaded portions are axially separated by an unthreaded intermediate portion of reduced diameter formed with three slots whose inner edges define an equilateral triangle axially of the screw body. The slots define three resilient springy webs each extending 120° circumferentially of the screw body. Corners of each web are disposed in registration with the other two webs axially of the screw body. The intermediate portion is deformed slightly to misalign the two threaded portions of the screw body. When the rotor is screwed into the stator, the misaligned threaded portions are held in precise alignment by the springy web portions, and the rotor is frictionally locked in place in the stator.

1 Claim, 8 Drawing Figures

ADJUSTABLE LOW LOSS CAPACITOR WITH SLOTTED ROTOR

The present invention relates to adjustable low loss capacitors having an improved controlled slotted tuning adjustment screw which operates longitudinally and eliminates backlash.

Capacitors embodying the invention are used for tuning or as trimmers and have maximum capacitances of the order of from 1 to 500 micro-microfarads. The minimum capacitance for the range of adjustability is usually less than ten percent of the maximum capacitance. The capacitance varies linearly with respect to angular displacement of the tuning screw with a high degree of precision throughout the adjustment range.

The capacitor comprises a stator unit and a rotor unit each having a series of coaxially arranged cylindrical electrode tubes. The stator tubes are rigidly connected by a hollow cylindrical insulation member with an interiorly threaded stator bushing. The rotor unit comprises an externally threaded screw which engages the internal threads of the stator bushing with a precision fit. One end of the rotor screw carries an axially displaceable group of rotor tubes which enter between and are spaced from the stator tubes. The outer end of the rotor screw is formed with a diametral screwdriver slot for turning the rotor unit. The rotor screw is formed with axially spaced transverse slots located intermediate its ends.

To the extent described, the capacitor construction is generally known in the art, for example as described in U.S. Pat. No. 3,469,160 patented Sept. 23, 1969. A principal difficulty and disadvantage encountered with a capacitor having a rotor with two transverse slots as described in the above mentioned patent is that a crankshaft motion results when the rotor screw is turned, which damages the thread by producing uneven thread wear, and consequently, backlash ensued, precision contact of threads is lost, turning of the screw becomes rough and irregular, and application of constant torque does not result in linear change in capacitance.

The present invention involves an improvement in rotor construction in that three slots spaced axially of the rotor screw, and extend radially inward distances greater than the radius of an intermediate unthreaded portion of the screw between two threaded portions of the screw. The slots define three resilient springy webs each extending circumferentially externally precisely 120° in sequence around the screw. Overlapped inner edges of the adjacent slots define an equilateral triangle axially of the rotor. This novel construction provides a number of unexpected advantages. The crankshaft motion referred to above is eliminated so threads do not wear unevenly. Better contact without backlash is obtained between mating threads of the stator and rotor. The rotor turns more smoothly with even torque producing precisely linear change in capacitance.

It is therefore a principal object of the present invention to provide a miniature capacitor having an externally threaded rotor screw with three axially spaced slots. A further object of the present invention is to provide a variable capacitor with a rotor screw as described, wherein the inner edges of the overlapped slots define an equilateral triangle, and wherein the slots have external webs each extending 120° circumferentially of the screw and arranged in sequence circumferentially and axially of the screw.

These and other objects and many of the attendant advantages of this invention will be readily appreciated as the same becomes better understood by reference to the following detailed description when considered in connection with the accompanying drawings in which.

Figure 3:
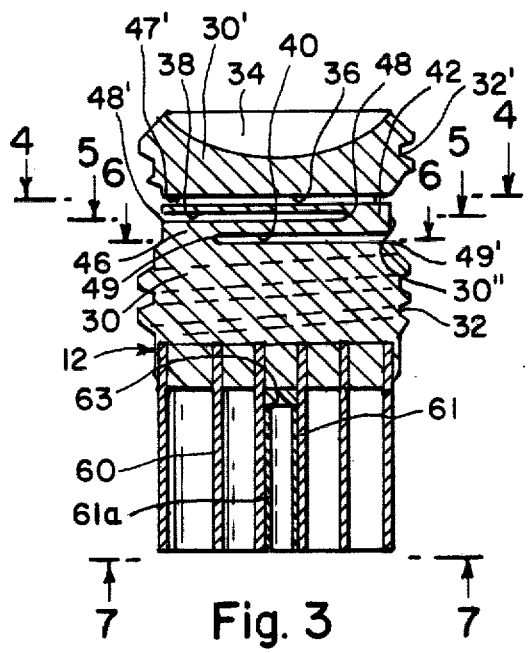
FIG. 3 is a diametral axial sectional view taken along line 3—3 of FIG. 2.
Figure 4:
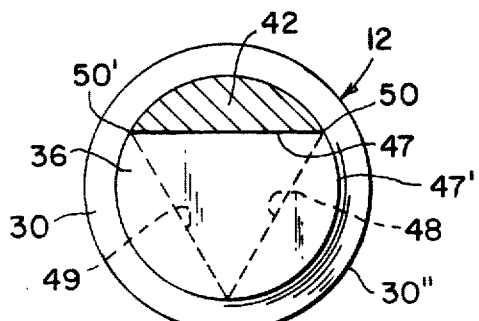
Figure 5:
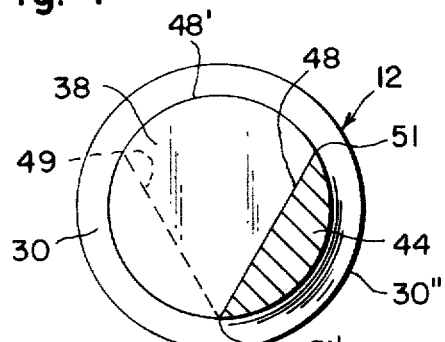
Figure 7:
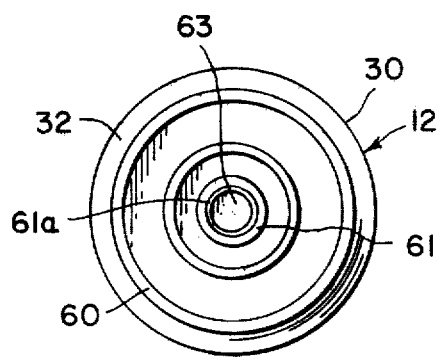
Figure 6:
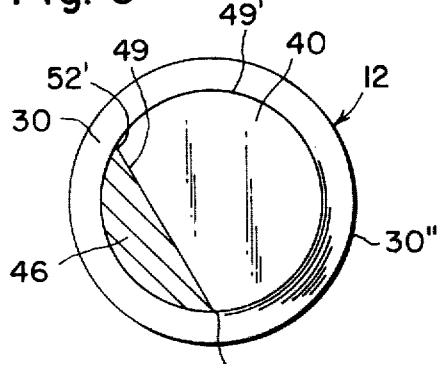

FIGS. 4, 5, and 6 are cross sectional views taken along lines 4—4, 5—5 and 6—6 respectively of FIG. 3;

FIG. 7 is a bottom plan view taken along line 7—7 of FIG. 3; and

Figure 8:
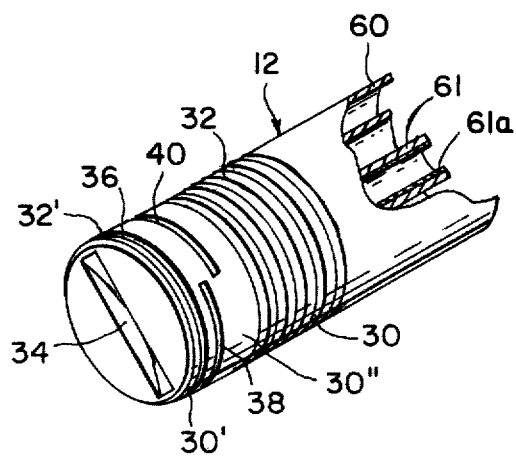
Figure 2:
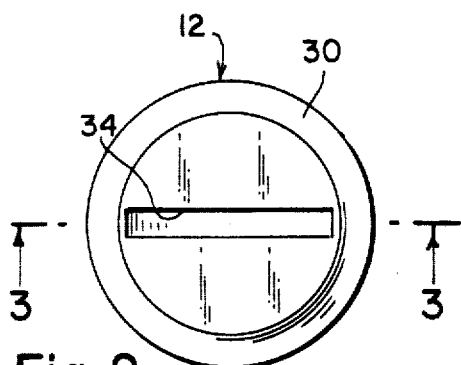
FIG. 2 is a top plan view of the rotor screw per se.

FIG. 8 is a perspective view of the rotor screw per se, parts being broken away.

Figure 1:
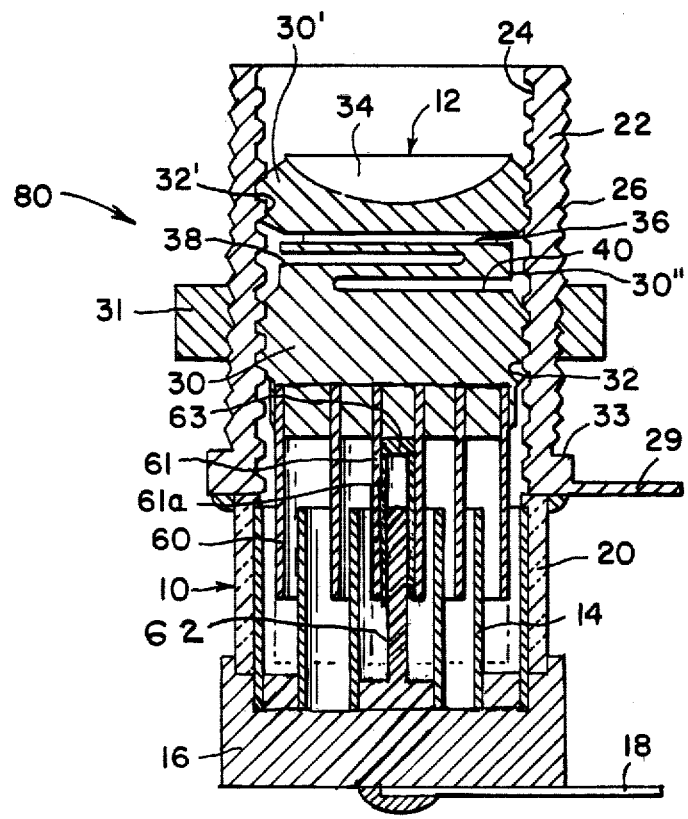
FIG. 1 is greatly magnified diametral axial sectional view of a variable capacitor having a rotor screw embodying the invention.

Referring now to the drawings wherein like reference characters designate like or corresponding parts throughout, there is illustrated in FIG. 1, a variable capacitor generally designated as reference numeral 80 having a stator generally designated by reference numeral 10 and a rotor generally designated by reference numeral 12. The stator 10 comprises a plurality of metal tubes 14 concentrically disposed and radially spaced apart. The tubes 14 secured to a conductive disc 16 to which is secured conductive lead or tab 18. A central abutment 62 is integrally formed with the stator 10 for a purpose to be hereinafter more fully described. A cylinder 20 made of insulative material such as glass or ceramic is secured at one end to the disc 16 and concentrically surrounds the tubes 14. A conductive cylindrical bushing 22 is secured to the other end of the insulated cylinder 20. The bushing 22 has an internal thread 24 and an external thread 26. A mounting nut 28 is threaded on the external thread 26. A conductive lead or tab 29 extends radially from the bushing 22. A nut 31 on the bushing 22 will hold the capacitor 80 on a panel in cooperation with an annular ledge 33.

Axially disposed inside the stator 10 is the rotor 12 which has a conductive cylindrical screw 30 provided with an external thread 32. The screw 30 has a slot 34 at its outer end to receive a screwdriver for turning the screw 30. The thread 32 mates precisely with the internal thread 24 of the stator bushing 22. Three slots 36, 38, and 40, shown in FIGS. 1–8 are formed in the rotor screw 30. Each slot has a resilient, springy web 42, 44, or 46, each of which extends 120° circumferentially around the outside of the screw. Each slot has an internal edge 47, 48, or 49 extending chordially or the screw 30. Corners 50, 50', 51, 51', and 52, 52', at intersections of the webs and slot edges are in registration. Thus the corner 50 of the slot 36 registers with the corner 51 of the adjacent slot 38 but is axially spaced therefrom. The corner 51' of the slot 38 registers with the corner 52 of the slot 40 but is axially spaced therefrom. The corner 51' of the slot 36 registers with the slot 52' of the slot 40 but is axially spaced therefrom. It will be noted that the webs 42, 44, and 46 are arranged in sequence clockwise around the screw 30 as viewed in FIGS. 4, 5, 6, and 8. The screw 30 is slightly deformed axially of the rotor 10 so that the outer edges 47', 48', and 49' as viewed in FIG. 3 are spaced closer together axially than the widths of the inner edges 47, 48, and 49 respectively. Outer end portion 30' of the screw 30 is slightly axially offset from the axis of the inner threaded portion of the screws 30. Secured to the other, inner end of the screw 30 is a plurality of conductive cylindrical tubes 60 radially spaced apart and concentrically disposed to interfit with the tubes 14 but radially spaced therefrom. A central tube 61 may be coated with an insulative material 60a such as Teflon ® and have a central axial stop 63 made of insulative material to stop inner axial movement of the screw 30 when the stop 63 contacts the central abutment 62. A typical rotor 12 of the type described may be about 0.2 inches in diameter and about 0.3 inches in axial length.

When the rotor 12 is inserted axially into the stator 10, the screw 30 turns smoothly until the outermost slot 36 passes into the bushing 22. At this point an end thread 32' engages the thread 24. This forces an outer end portion 30' of the screw 30 into precise axial alignment with the inner portion of the screw 30. A slotted inner screw section 30" bends at the webs causing the threads to lock frictionally and eliminates backlash. By providing three slots instead of the previous two slots heretofore known, the strain is equally distributed around the screw 30 so that the engagement of the internal and external thread is locked all around the screw instead of being bilaterally applied as in the prior rotor constructions. Thus the crankshaft motion imparted to the screw 30 encountered with prior two-slot rotors is eliminated. Better contact is maintained between thread 24 and 32, 32', so the screw 30 turns more smoothly and uniform torque can be applied to effect uniform changes in capacitance as the rotor tubes 60 move axially into and out of tubes 14.

It should be understood that the foregoing relates to only a preferred embodiment of the invention which has been by way of example only and that it is intended to cover all changes and modifications of the examples of the invention herein chosen for the purpose of the disclosure, which do not constitute departures from the spirit and scope of the invention.

What is claimed is:

1. In an adjustable air dielectric capacitor having a hollow cylindrical stator with an internally threaded bushing at one end, an axially adjoining insulative cylindrical body, a conductive end member and concentric radially spaced conductive tubes inside said cylindrical body and a rotor, said rotor; comprising:

a rotatable cylindrical screw body having externally threaded portions for engaging the internal thread of said bushing;

said threaded portions being axially separated by an unthreaded intermediate portion of reduced diameter;

said intermediate portion being formed with three slots;

said slots extending inwardly of said screw body equal distance greater than the radius of said intermediate portion, and spaced apart axially equal distances in said intermediate portion;

said slots defining three resilient, springy webs extending 120° circumferential in said intermediate portion of said screw body, and wherein opposite corners of each web are disposed in registration with corresponding corners of the other two webs axially of said screw body;

opposite sides of said slots being angularly disposed to each other by slight deformation of said intermediate portion so that said one threaded end of said screw body is normally angularly offset axially from the other threaded portion of said screw body, whereby said one threaded end portion of said screw body is forced into precise axial alignment with said other threaded portion of said screw body when said screw body is fully engaged with said internally threaded bushing; thereby frictionally locking said screw body in said stator; and at least one cylindrical other conductive tube extending axially from said screw body for nesting in the first named conductive tubes when said screw body is axially advanced and turned in said stator.

* * * * *